United States Patent
Parker

[15] 3,694,846
[45] Oct. 3, 1972

[54] MECHANISM FOR OPENING AND CLOSING A COVER FOR A CONCEALED WINDSHIELD WIPER SYSTEM

[72] Inventor: Eric George Parker, Kettering, Ohio

[73] Assignee: General Motors Corporation, Detroit, Mich.

[22] Filed: Nov. 30, 1970

[21] Appl. No.: 93,652

[52] U.S. Cl............................15/250.16, 15/250.19
[51] Int. Cl................................................B60s 1/08
[58] Field of Search..........15/250.16, 250.17, 250.19

[56] References Cited

UNITED STATES PATENTS 3,226,756  1/1966  Heiler.....................15/250.19
3,290,715  12/1966  Heiler.....................15/250.19

*Primary Examiner*—Peter Feldman
*Attorney*—W. E. Finken and W. A. Schuetz

[57] ABSTRACT

In a preferred form, this disclosure relates to a cover concealed windshield wiper apparatus for an automotive vehicle having a windshield which extends within a well extending transversely of the vehicle and a cover means movable between a closed position in which it covers the well and an open position in which it uncovers the well. The windshield cleaning apparatus includes a pair of spaced oscillatable windshield cleaner assemblies, a drive means including a motor having a rotary output shaft for oscillating the windshield cleaners across the windshield between an outboard position and an inboard position in which the windshield cleaner assembly is disposed within the well, and a cover operating mechanism for moving the cover from its closed position towards its open position, and vice versa, in response to initial and final rotative movement of the output shaft of the wiper motor when wiper operation is initiated and being terminated, respectively.

3 Claims, 12 Drawing Figures

PATENTED OCT 3 1972

INVENTOR.
Eric George Parker
BY
W.A. Schuetz
ATTORNEY

PATENTED OCT 3 1972 3,694,846

INVENTOR.
Eric George Parker
BY
W. A. Schuetz
ATTORNEY

INVENTOR.
Eric George Parker
BY
W. A. Schuetz
ATTORNEY 3,694,846

MECHANISM FOR OPENING AND CLOSING A COVER FOR A CONCEALED WINDSHIELD WIPER SYSTEM

The present invention relates to a cover concealed windshield wiper apparatus, and in particular to a cover concealed windshield wiper apparatus for wiping a windshield which extends within a well located beneath a movable cover and in which the wipers are parked on the windshield within the well at their inboard stroke end positions.

Heretofore, cover concealed windshield wiping systems in which a pair of windshield wipers are concealed from view beneath a cover have been provided. These known systems have included a separate motor and drive arrangement for moving the cover between closed and open positions. Known systems have also included mechanisms which are automatically operable to move a cover to an open position in response to movement of the wipers from a depressed park position toward their inboard stroke end position. An example of the latter type of system is shown in U.S. Pat. No. 3,226,756.

The present invention provides a novel cover concealed windshield wiper apparatus having a nondepressed park windshield wiper mechanism and a cover operating mechanism for moving a cover between its closed and open positions in response to initial actuation of the windshield wiper mechanism and in response to the windshield wiper operation being terminated.

An important object of the present invention is to provide a new and improved cover concealed windshield wiping apparatus for a vehicle having a windshield which extends within a transversely extending well defined by body structure of the vehicle and a cover which is movable between closed and open positions for covering and uncovering the well, and in which the windshield wiper apparatus includes a non-depressed park wind-shield wiper mechanism having a wiper motor and a pair of wind-shield cleaner assemblies oscillatable across the outer surface of the windshield between an outboard position and an inboard or park position located within the well and a cover actuating mechanism operatively associated with an output shaft of the wiper motor for moving the cover from its closed position towards its open position, and vice versa, in response to initial and final rotative movement of the output shaft of the windshield wiper motor when wiper operation is being initiated and being terminated, respectively.

A further object of the present invention is to provide a new and improved cover concealed windshield wiping apparatus, as defined in the preceding object, and wherein the cover operating mechanism includes a cam means connected with the output shaft of the wiper motor and a linkage means operatively connected with the cover and operatively associated with the cam means for effecting movement of the cover between its positions in response to initial and final rotative movement of the cam means being imparted by the output shaft.

A further object of the present invention is to provide a new and improved cover concealed windshield wiping apparatus, as defined in the next preceding object, and in which the cam means includes a pair of rotatable cam surfaces and in which the linkage means includes a pair of pivotally supported levers with one of the levers being biased into engagement with the cam surfaces and operatively connected with the cover means, and in which the construction and arrangement between the cam means and the levers is such that the cover is caused to be moved between its positions in response to initial and final rotative movement of the cam means.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

Figure 1:
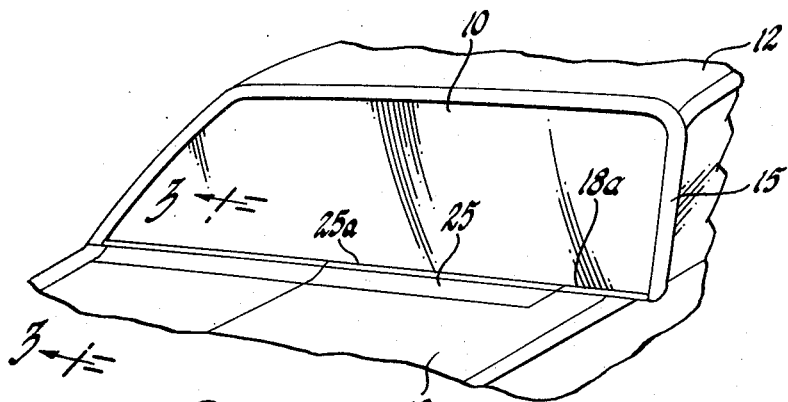
FIG. 1 is a fragmentary front perspective view of a vehicle embodying the novel cover concealed windshield wiping apparatus of the present invention and showing the cover thereof in its closed position.

As representing a preferred embodiment of the present invention, the drawings show a cover concealed windshield wiping apparatus or system A for wiping a windshield 10 of an automotive vehicle 12. The windshield 10 is supported by suitable body structure 14 on the vehicle 12 and its outer peripheral sides and top are surrounded by a reveal molding 15. The vehicle 12 also includes a forwardly extending hood 18 whose rearward edge 18a engages the windshield and which defines with the body structure 14 a well 20 extending transversely across the vehicle 12. The well 20 has an access opening 21 at its upper end.

Figure 2:
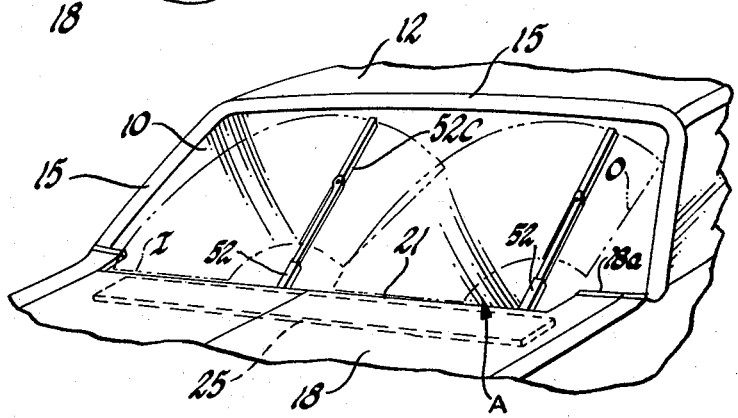
FIG. 2 is a view similar to FIG. 1 but showing different parts thereof in different positions.
Figure 4:
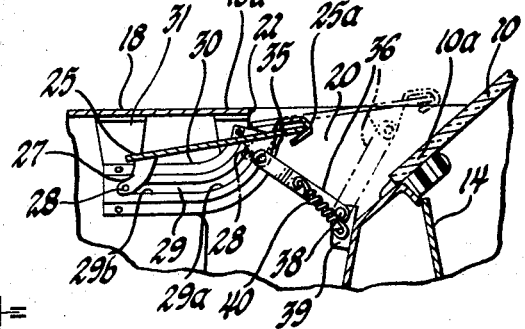
FIG. 4 is a view like FIG. 3 but showing different parts thereof in different positions.
Figure 5:
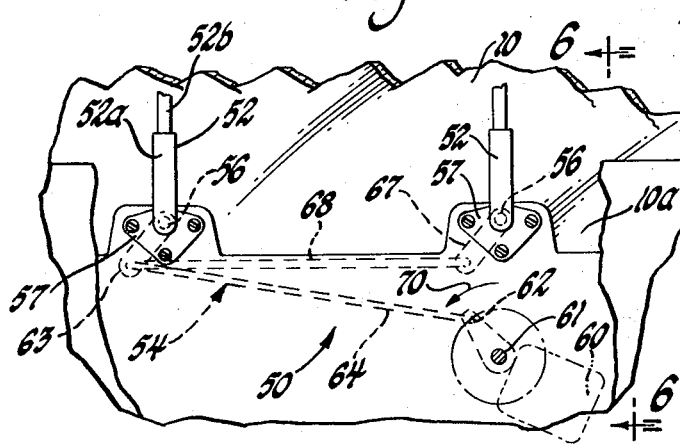
FIG. 5 is an enlarged fragmentary view of part of the cover concealed windshield wiper apparatus of the present invention.

The access opening 21 is adapted to be either covered or uncovered by a cover 25. The cover 25 is movable between closed and open positions. When in its closed position, as shown in FIG. 1, it forms a continuation of the hood 18 and its rearward edge 25a is in engagement with the windshield 10, the windshield 10 having a lower portion 10a which extends down into the well 20. The cover 25 when in its open position, as shown in FIGS. 2 and 4, is disposed beneath the hood 18 and located substantially parallel thereto. Secured to the cover 25 at its opposite side edges are downwardly extending ears 27, each of which carries a roller 28. The rollers 28 are received within guide slots 29 of guide means 30. The guide means 30 are supported on the underside of the hood 18 by brackets 31. The guide slots 29 have a curved portion 29a and a forwardly extending straight portion 29b. The cover 25 at its opposite sides adjacent its rearward end has a pair of downwardly extending ears 35, each of which is pivotally connected to one end of a link or lever 36. The other end of the links or levers 36 is fixed to a transversely extending control rod or shaft 38 having its opposite ends pivotally journalled in suitable brackets 39 secured to the body structure 14 of the vehicle 12.

Figure 3:
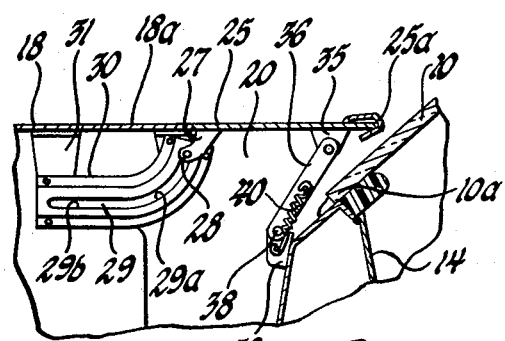
FIG. 3 is an enlarged cross-sectional view taken approximately along line 3—3 of FIG. 1.

The cover 25 is movable from its closed position, as shown in FIGS. 1 and 3, towards its open position, as shown in FIGS. 2 and 4, when the lever 36 is rotated in the counterclockwise direction. As the lever 36 is rotated in the counterclockwise direction the cover 25 is initially guided for downward movement due to the arcuate guide slot portions 29a and then guided forwardly beneath the hood 18 by the guide slot portions 29b. The cover 25 is movable from its open position toward its closed position in response to rotation of the lever 36 in a clockwise direction, during which the cover 25 moves in the reverse path of movement.

The cover 25 is biasingly held in either its closed or open positions by a pair of overcenter spring means 40 (only one of which is shown) located at its opposite sides. The spring means 40 have one end connected to the levers 36 and their other end connected to the brackets 39. When the cover is in its closed position, as shown in FIG. 3, the longitudinal axes of the spring means 40 are located to the right of the axis of the control rod 38 and when in its open position, as shown in FIG. 4, the longitudinal axes of the spring means 40 are located to the left of the axis of the control rod 38. Thus, as the cover 25 is moved from one position toward its other position the spring means 40 will move over center from one side of the axis of the control rod 38 to the other side of the axis of the control rod 38 and biasingly hold the cover 25 in either its closed or open positions.

The cover concealed windshield wiping system A also includes a non-depressed park wiper mechanism 50 which is carried by the vehicle support means 14. The wiper mechanism 50 comprises a pair of windshield cleaner assemblies or wipers 52 and a drive means 54 for oscillating the wipers 52 across the outer surface of the windshield 10 between outboard positions, designated by the letter O, and inboard positions, designated by the letter I. The wipers 52 when in their inboard position I are located on the lower portion 10a of the windshield 10 and in the well 20. The inboard position of the wipers 52 is also the park position of the windshield wipers 52.

The windshield wipers 52 can be of any suitable or conventional construction and are hereshown as comprising a wiper arm having spring hinge connected inner and outer wiper arm sections 52a and 52b for biasing a wiper blade assembly 52c, which is carried by the outer wiper arm section 52b, against the outer surface of the windshield 10. The inner wiper arm sections are adapted to be fixedly secured to drive pivots 56, which are rotatably supported in a suitable bracket means 57 secured to the body structure 14 of the vehicle 12.

The drive means 54 for oscillating the wipers 52 comprises a unidirectional electric motor and gear reduction unit 60 having a rotary output shaft 61. The electric motor and gear reduction unit 60 could be of any suitable or conventional construction. Secured to the rotary output shaft 61 is one end of a crank arm 62, the other end of the crank arm 62 in turn being drivingly connected with one end of a crank arm 63 fixed to the drive pivot 56 of the leftmost wiper 52 via a drive link 64. The crank arm 62 is also drivingly connected to one end of a crank arm 67 secured to the drive pivot 56 for the rightmost wiper 52 via a cross link 68.

In operation, when the wiper motor and gear reduction unit 60 is energized the crank arm 62 is caused to be rotated in the direction of the arrow 70. Rotation of the crank arm 62 in the direction of the arrow 70 causes the drive link 64 to be reciprocated, which in turn causes the crank arms 63 and 67 to be reciprocated to reciprocate or oscillate the wipers 52 in tandem across the outer surface of the windshield 10. Energization and de-energization of the wiper motor is preferably controlled by a suitable manually manipulatable on-off control switch (not shown) which is readily accessible to the operator of the vehicle. The control switch when in its on position would be in a first series circuit (not shown) with the wiper motor and the vehicle battery. The control switch when in its off position would be in a second circuit with the wiper motor and vehicle battery, which circuit would also include a conventional parking switch (not shown). The parking switch would be biased toward a closed position to maintain the wiper motor 60 energized upon the manual switch being moved to its off position until the wipers 52 reach their park position whereupon a cam (not shown) driven by the wiper motor 60 would open the park switch to effect de-energization of the wiper motor 60.

In accordance with the provision of the present invention a novel cover operating mechanism 80 is provided for moving the cover 25 from its closed position towards its open position, and vice versa, in response to initial and final rotative movement of the output shaft 61 of the wiper motor and gear reduction unit 60 when wiper operation is initiated and being terminated. The cover operating mechanism 80 broadly comprises a cam means 81 drivingly connected with the output shaft 61 of the motor and gear reduction unit 60 and a linkage means 82 operatively connected with the control rod 38 and operatively associated with the cam means 81 for effecting rotation of the control rod 38 and hence, movement of the cover 25 when wiper operation is being initiated and being terminated.

The cam means 81 comprises an annular member 83 having a forward end face 83a and a rearward end face 83b. The member 83 has an annular peripheral groove 84 defined by a bottom surface 84a, an annular rearward side surface 84b and a substantially annular forward side surface 84c. The annular bottom and rearward side surfaces 84a and 84b define a first cam surface means. The member 83 also has an axially and generally radially extending recess or slot 86 at its forward end. The slot 86 is defined by side and bottom edges 86a and 86b which comprise a second cam surface means. The annular member 83 also has a forwardly or axially extending pin or projection 88 located at a fixed radial distance d from the axis 61a of the output shaft 61.

Figure 7:
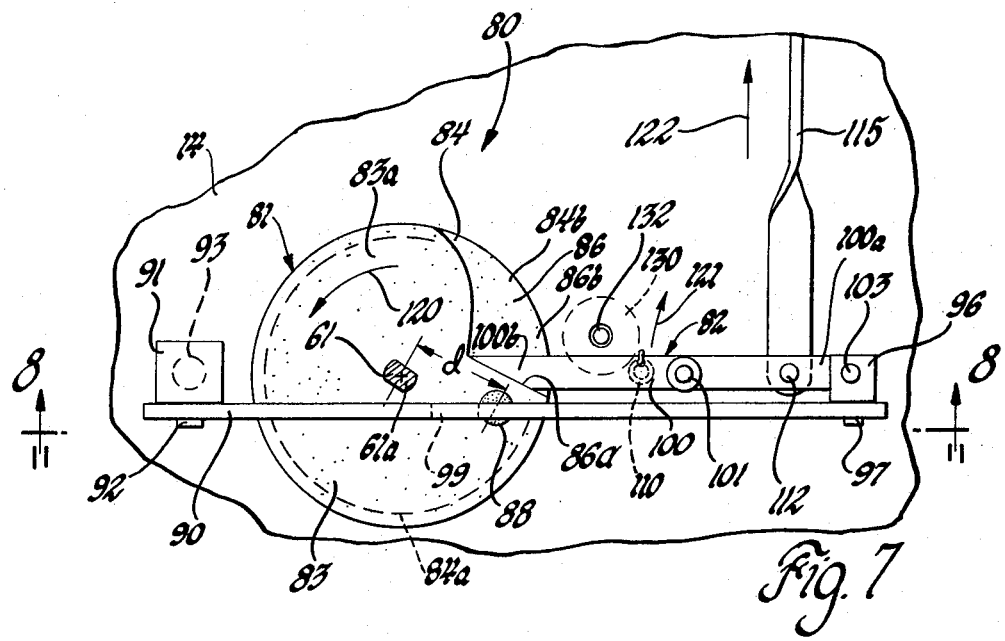
FIG. 7 is an enlarged elevational view of part of the cover concealed windshield wiping apparatus of the present invention.

The linkage means 82 is adapted to be actuated in response to initial rotation of the cam means 81 when wiper operation is being initiated to move the cover 25 from its closed position toward its open position and is actuated by the cam means 81 to move the cover from its open position towards its closed position when wiper operation is being terminated. To this end, the linkage means 82 comprises a first lever or link member 90 which is located slightly forwardly from and extends across the cam means 81. The lever 90 has its left end, as shown in FIG. 7, pivotally connected to a support block 91 for movement toward and from the forward end face 83a of the cam means 83 by a pivot pin means 92. The support block 91 is also pivotally mounted via a pivot pin means 93 to the support structure 14 of the vehicle 12 to enable the first lever 90 to also pivot or be moved toward and from the axis 61a of rotation of the output shaft 61. The lever 90 at its other end is pivotally connected to a support block 96 by a pivot pin means 97 for pivotal movement about an axis which is parallel to the axis of the pivot pin means 92. The lever 90 intermediate its ends has a projection or tab 99 which extends downwardly toward the end face 83a of the cam member 83, and for reasons to be hereinafter described.

The linkage means 82 further includes a second lever or link member 100 which is swively supported intermediate its ends by the support structure 14 via a ball and socket joint 101. The lever 100 at its right end 100a, as viewed in FIG. 7, is pivotally connected to the block 96 by a pivot pin means 103 for movement about an axis which extends parallel to the axis 61a of the output shaft 61. The lever 100 thus is free to swivel or move axially of the cam means 81 as well as radially toward and from the cam means 81. The lever 100 at its free or left end 100b, as viewed in FIG. 7, is tapered and biased into engagement with the cam means 81 by a tension spring 110. The spring 110 is located closely adjacent the ball and socket joint 101 and has one end slidable secured to the lever 100 and its other end secured to the support 14 of the vehicle 12. The lever 100 intermediate its ends is also pivotally connected by a pivot pin means 112 to one end of a link 115. The other end of the link 115 is pivotally connected to one end of a link 116, the other end of the link 116 in turn being fixed to the control rod 38.

Figure 6:
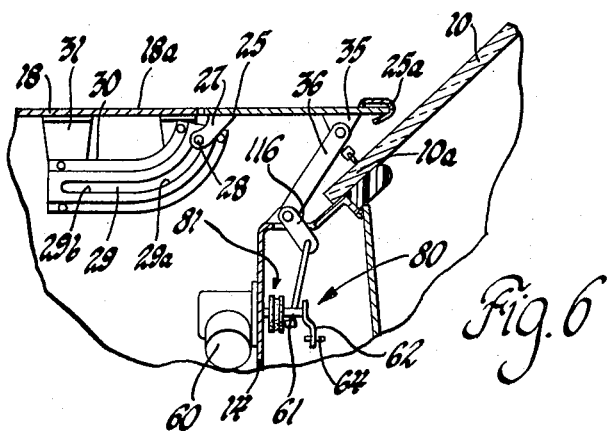
FIG. 6 is an enlarged sectional view taken approximately along line 6—6 of FIG. 5.
Figure 9:
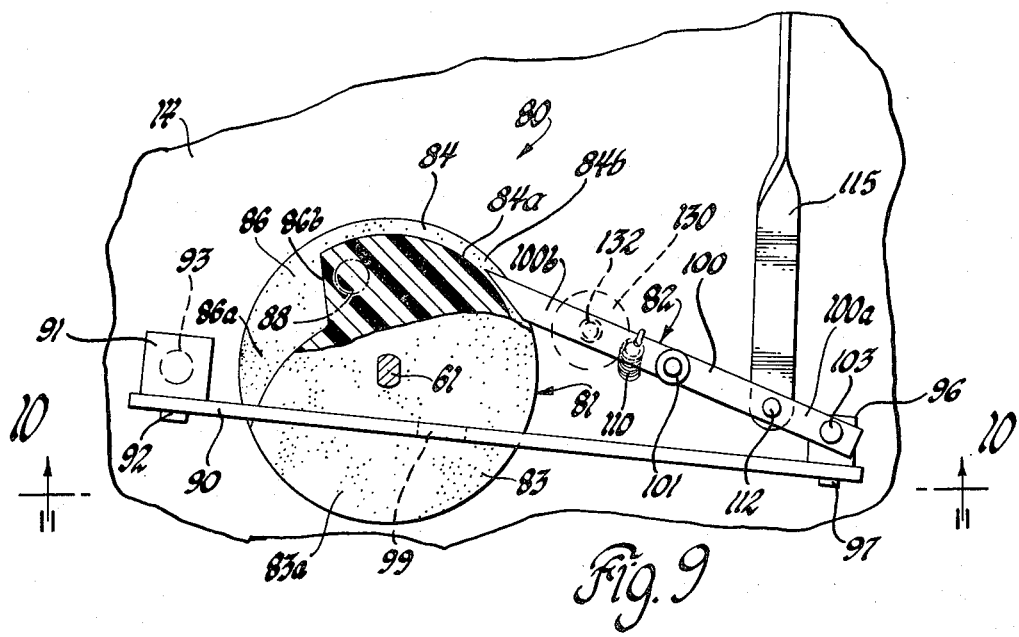
FIG. 9 is a view similar to FIG. 7 but showing different parts thereof in different positions.

When the wipers 52 are in their inboard position I and the cover 25 is in its closed position, the linkage means 82 is in the position shown in FIG. 7. In this position the free end of the lever 100 is in engagement with the second cam surfaces 86a and 86b. The linkage means 82 is adapted to be moved from its first position, as shown in FIG. 7 toward its second position, as shown in FIG. 9, during which it effects opening movement of the cover 25 in response to initial rotation of the cam means 81 by the output shaft 61 upon the wiper motor and gear reduction unit 60 being energized. When the wiper motor and gear reduction unit 60 are energized the output shaft 61 rotates the cam means 81 in the direction of the arrow 120. Rotation of the cam means 81 in the direction of the arrow 120 causes the cam surface 86a to move the lever 100 radially outwardly of the cam means 81 in the direction of the arrow 121. As the lever 100 is moved in the direction of the arrow 121 it causes the link member 115 to be moved in the direction of the arrow 122, which in turn causes the link member 116 and the control rod 38 to be pivoted in a counterclockwise direction, as viewed in FIGS. 3 or 6. Movement of the control rod 38 in the counterclockwise direction causes the cover 25 to be moved from its closed position toward its open position, and in a manner hereinbefore described. The lever 100 is pivoted in the direction of the arrow 121 until it is disengaged from the cam surface 86a at which time the spring 110 will cause the same to be moved downwardly into the groove 84 and into engagement with the bottom and side surfaces 84a and 84b.

The movement of the linkage means 82 to effect opening movement of the cover 25 is such that the cover means 25 is moved sufficiently toward its open position to provide sufficient clearance to enable the wipers 52 to pass through the access opening 21 upon their reaching the access opening 21 during movement through their outboard stroke.

The link members 90 and 100 remain in the position shown in FIG. 9 while the wipers 52 are being oscillated during running operation. The cover 25 is held in its open position by virtue of the overcenter spring means 40. The overcenter spring means 40 also serve to biasingly hold the control rod 38, links 116, 115 and lever 100 in the position shown in FIG. 9 during running operation of the wipers 52. It should be noted that when the linkage means 82 is in the position shown in FIGS. 9 and 10, the downwardly extending projection 99 on the lever member 90 is out of the path of movement of the pin member 88.

Figure 10:
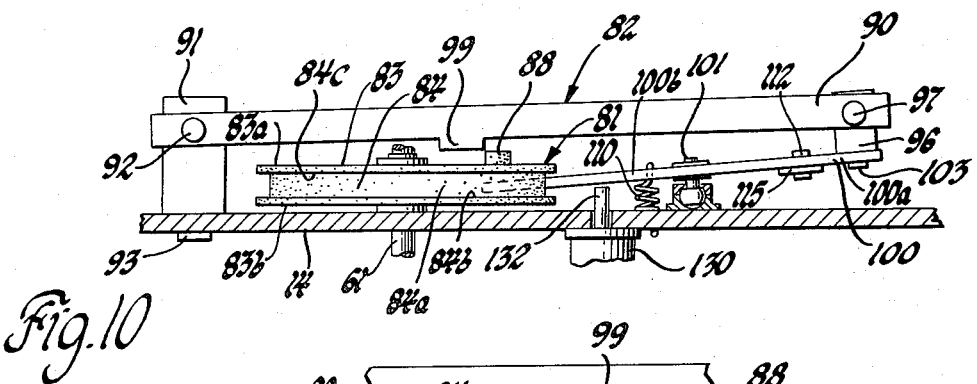
FIG. 10 is a side elevational view looking in the direction of the arrows 10—10 of FIG. 9.
Figure 11:
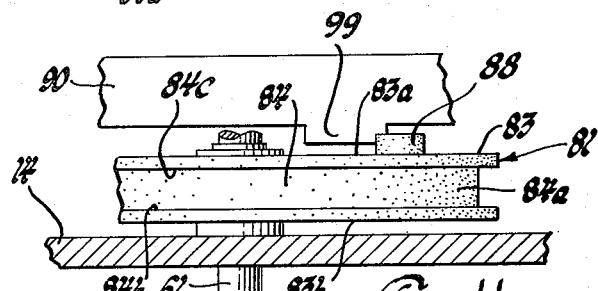
FIGS. 11 and 12 are enlarged fragmentary views of part of the windshield wiping apparatus shown in FIG. 10.
Figure 12:
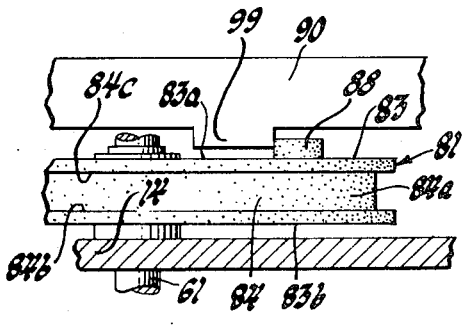

When wiper operation is no longer desired the operator will move the manual control switch (not shown) for controlling energization and de-energization of the wiper motor to its off position. As noted before, the wiper motor has a conventional park switch (not shown) in a series circuit with the manual control switch when the latter is in its off position which maintains the wiper motor 60 energized until the wipers 52 have reached their park position. When the wiper motor control switch (not shown) is moved to its off position a solenoid 130 is also energized to effect movement of the free end 100b of the lever 100 from its second position, as shown in FIGS. 9 and 10 upwardly toward an intermediate position in which it is in engagement with the cam surface 84c. The solenoid 130 is normally de-energized during running operation of the wiper motor but is in the series circuit with the manual control switch when the latter is in its off position and the park switch of the wiper motor. The solenoid 130 is thus energized when the wiper motor switch (not shown) is moved to its off position and remains energized until the park switch is opened. The solenoid 130 is suitably supported by the support structure 14 and includes a movable core 132 which is moved upwardly (as viewed in FIG. 8) when the coil of the solenoid 130 is energized to engage the underside of the lever 100 to move the same to its intermediate position.

Figure 8:
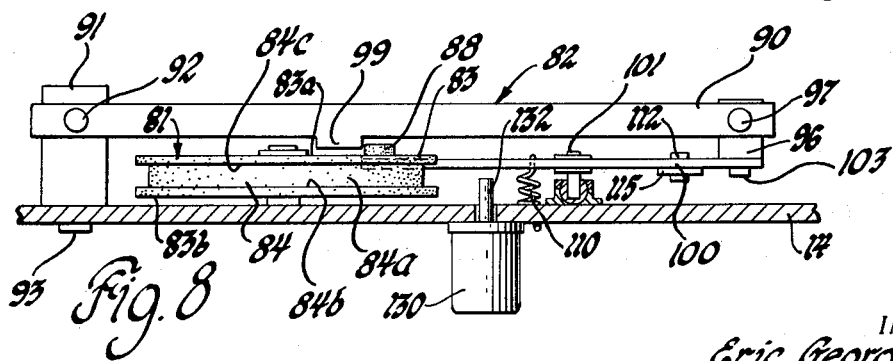
FIG. 8 is a sectional view taken approximately along line 8—8 of FIG. 7.

When the lever 100 is moved towards its intermediate position the right end thereof, as viewed in FIGS. 8 and 10, is moved downwardly which in turn causes the lever 90 to be moved downwardly to a position in which the projection 99 thereon is located within the path of movement of the pin 88 carried on the cam 82. The lever 100 remains in this position until the pin 88 on the cam 82 engages the projection 99 on the lever 90. When this occurs the pin 88 on the cam 82 causes the lever 90 to be moved in the direction of the arrow 120 and the lever 100 to be moved in the direction opposite the direction of the arrow 122 and radially inwardly of the slot 86. The slot 86 is aligned with the lever 100 when the pin 88 engages the projection 99 on the lever 90. This movement continues as long as the pin 88 is in engagement with the projection of the lever 90. When the lever 100 has been moved wholly within the slot 86 and it is about to engage the cam surface 86a the pin 88 disengages itself from the projection 99 of the lever 90. The radial distances between the pin 88 and the projection 99 with respect to the axis of rotation of the shaft 61 are such that the pin 88 disengages the projection 99 when the lever 100 is about to engage the cam surface 86a.

As the lever 100 is moved from its intermediate position towards its first position, as shown in FIG. 7, the cover 25 is moved from its open position towards its closed position. This closing movement of the cover 25 occurs as the wipers are being moved toward their inboard stroke end position and is such that the wipers will be located beneath the cover 25 prior to the cover 25 being fully moved to its closed position.

When the wipers 52 reach their inboard stroke end or park position, the park switch (not shown) is opened. This causes the wiper motor 60 and the solenoid 130 to be de-energized.

From the foregoing, it should be apparent that the present invention is a novel cover concealed windshield wiping arrangement for a non-depressed park type wiper system in which the wipers are parked on the glass in a well located beneath the cover. It should also be apparent that opening and closing movement of the cover is effected in response to initial and final rotative movement of the wiper motor shaft 61.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A cover concealed windshield wiping apparatus for an automotive vehicle having a windshield, vehicle support structure for supporting the windshield and which defines a well extending transversely of the vehicle, the well having an upper access opening and the windshield having its lower portion extending within the well, and a cover means movable between a closed position in which it covers said access opening and an open position in which it uncovers said access opening, said windshield wiping apparatus comprising a pair of spaced oscillatable windshield cleaner assemblies, a drive means including a motor having an output shaft rotatable about a single axis and operatively connected with the windshield cleaner assemblies for oscillating the same across the window between an outboard stroke end position and an inboard stroke end position located within the well and for parking the same at their inboard stroke end positions, and a cover operating mechanism operatively associated with said output shaft for moving said cover from its closed position towards its open position, and vice versa, in response to initial and final rotative movement of said output shaft about said axis when wiper operation is initiated and terminated, respectively.

2. A cover concealed windshield cleaning apparatus for an automotive vehicle having a windshield, a support structure for supporting the windshield and which defines a well extending transversely of the vehicle, said well having an access opening at its upper end and said windshield extending within said well, a cover means supported for movement between a closed position in which it covers said access opening at an open position in which it uncovers said access opening, said windshield wiping apparatus comprising a pair of spaced oscillatable windshield cleaner assemblies, a drive means including a motor having an output shaft rotatable about a single axis and operatively connected with the windshield cleaner assemblies for oscillating the same across the windshield between an outboard stroke end position and an inboard stroke end position located within the well and for parking the same in their inboard position, and a cover operating mechanism for moving said cover from its closed position towards its open position, and vice versa, in response to initial and final rotative movement of said output shaft about said axis when wiper operation is initiated and being terminated, respectively, said cover operating mechanism comprising a cam means connected with said output shaft for rotation therewith and a linkage means connected with said cover and operatively associated with said cam means.

3. A cover concealed windshield wiping apparatus for an automotive vehicle having a windshield, vehicle support structure for supporting the windshield and defining a well extending transversely across the vehicle, said well having an access opening at its upper end and said windshield having its lower portion located within said well, a cover means supported for movement between a closed position in which it covers said access opening and an open position in which it uncovers said access opening, said windshield wiping apparatus comprising a pair of spaced oscillatable windshield cleaner assemblies, a drive means including a motor and with the rotatable output shaft operatively connected with the windshield cleaner assemblies for oscillating the same across the window between an inboard position located within the well and an outboard position and for parking the same in their inboard position, a cover operating mechanism for moving said cover from its closed position towards its open position, and vice versa, in response to initial and final rotative movement of said output shaft of said wiper motor when wiper operation is initiated and being terminated, said cover operating mechanism comprising a cam means connected with said output shaft for rotation therewith, said cam means having a substantially annular cam surface defined by a groove in its outer periphery and a second cam surface defined by a slot extending radially inwardly of the cam means at one end thereof, said cam means also having a projection spaced from its axis of rotation and which extends axially thereof, a linkage means connected with said cover and operatively associated with said cam means, said linkage means comprising a first lever extending across said cam means and being pivotally supported at one end for movement toward and from said end of said cam and for movement transversely of said cam means, a second lever swivelly supported intermediate its ends and pivotally connected at one end to the other end of said first member for movement toward and from said cam means and said first lever, said second lever having its other free end biased in engagement with said cam means, said first lever having a downwardly extending projection portion, said second lever being movable between a first position in which its free end is disposed within said slot and a second position in which its free end is in engagement with said annular cam surface, said second lever being operatively connected with said cover and effecting movement of the latter from its closed position towards its open position when moved from its first position toward its second position and effecting movement of the cover from its open position towards its closed position when moved from its second position towards its first position, said second lever being in its first position when said windshield cleaner assemblies are parked in their inboard position and being movable from its first position towards its second position in which it rides on said annular cam surface in response to rotation of said cam means when said wiper motor is energized to cause the cover to be moved towards its open position, said projecting portion on said first lever being out of the path of movement of said projection on said annular cam when said second lever is in its second position, and means for effecting movement of said second lever axially of said cam toward an intermediate position in which it causes the projecting portion of said first lever to be located in the path of movement of said projection on said annular cam when wiper operation is being terminated, said second lever being movable from its intermediate position towards its first position in response to said projection on said cam means engaging said projecting portion on said first lever to move the latter and said second lever toward its first position and said cover toward its closed position.

* * * * *